United States Patent [19]

Zhang et al.

[11] Patent Number: 5,324,457

[45] Date of Patent: Jun. 28, 1994

[54] DEVICES AND METHODS FOR GENERATING ELECTROGENERATED CHEMILUMINESCENCE

[75] Inventors: Xun Zhang, Middle Island, N.Y.; Allen J. Bard, Austin, Tex.

[73] Assignee: Board of Regents, The University of TX System, Austin, Tex.

[21] Appl. No.: 835,049

[22] Filed: Feb. 11, 1992

Related U.S. Application Data

[63] Continuation of Ser. No. 416,241, Oct. 2, 1989, abandoned.

[51] Int. Cl.$^5$ .................. C09K 3/00; C09K 11/06; C09K 11/02; F21K 2/00
[52] U.S. Cl. .................................... 252/700; 362/34; 252/301.33; 252/301.36; 252/583
[58] Field of Search ........... 252/700, 583, 586, 301.33, 252/301.36; 362/34

[56] References Cited

U.S. PATENT DOCUMENTS

| | | | |
|---|---|---|---|
| 3,503,893 | 3/1970 | Hercules et al. | 252/700 |
| 4,054,368 | 10/1977 | Krueger et al. | 359/64 |
| 5,075,172 | 12/1991 | Dixon et al. | 428/422 |

OTHER PUBLICATIONS

Zhang, et al., "Electrogenerated Chemiluminescent Emission from an Organized (L-B) Monolayer of a Ru(bpy)$_3^{2+}$-Based Surfactant on Semiconductor and Metal Electrodes", J. Phys. Chem., vol. 92, No. 20, pp. 5566–5569 (1988).

Kalyanasundaram, "Photophysics, Photochemistry and Solar Energy Conversion With Tris (Bipyridyl)Ruthenium (II) and Its Analogues", Coordination Chemistry Reviews, vol. 46, pp. 159–244 (1982).

Daifuku, et al., "Electrode Kinetics of Surfactant Polypyridine Osmium and Ruthenium Complexes Confined to Tin Oxide Electrodes in a Monomolecular Layer by the Langmuir-Blodgett Method", J. Electroanal. Chem., vol. 183, pp. 1–26 (1985).

Lee, et al., "Comparative Electrochemical Studies of N-Methyl-N'-Hexadecyl Viologen Monomolecular Films Formed by Irreversible Adsorption and the Langmuir-Blodgett Method", J. Electroanal. Chem., vol. 239, pp. 441–446 (1988).

Fujihira, et al., "Electrochemistry of the Redox-Active Langmuir-Blodgett Films Coated on Glassy Carbon Electrodes", Bull. Chem. Soc. Jpn., vol. 59, pp. 2375–2379 (1986).

Facci, et al., "Characterization of Electroactive Langmuir-Blodgett Monolayers of (Ferrocenylmethyl)dimethyloctadecyl-ammonium Sulfate at Gold and Air/Water Interfaces", Langmuir, vol. 2, No. 6, pp. 732–738 (1986).

Yokota, et al., "Redox Behavior of Cytochrome c Immobilized Into a Lecithin Monolayer and Deposited onto SnO$_2$ by the Langmuir-Blodgett Technique", J. Electroanal. Chem., vol. 216, pp. 289–292 (1987).

Matsuda, et al., "Theory of Electrode Reactions of Redox Couples Confined to Electrode Surfaces at Monolayer Levels, Part I, Expression of the Current-Potential Relationship for Simple Redox Reactions", J. Electroanal. Chem., vol. 217, pp. 1–13 (1987).

Rubinstein, et al., "Polymer Films on Electrodes. 4. Nafion-Coated Electrodes and Electrogenerated Chemiluminescence of Surface-Attached Ru(bpy)$_3^{2+}$", J. Am. Chem. Soc., vol. 102, pp. 6641–6642 (1980).

Rubinstein, et al., "Polymer Films on Electrodes. 5. Electrochemistry and Chemiluminescence at Nafion-Coated Electrodes", J. Am. Chem. Soc., vol. 103, pp. 5007–5013 (1981).

Abruna, et al., "Electrogenerated Chemiluminescence.

(List continued on next page.)

*Primary Examiner*—Philip Tucker
*Attorney, Agent, or Firm*—Arnold, White & Durkee

[57] ABSTRACT

Devices and methods for generating electrogenerated chemiluminescence, using an electrode which is coated with an immobilized layer of a compound capable of generating ECL. The coated electrode can be immersed along with a second electrode into an electrolyte solution containing a reactant which can react with the immobilized compound to generate ECL.

32 Claims, 5 Drawing Sheets

OTHER PUBLICATIONS

40. A Chemiluminescent Polymer Based on the Tris(4-vinyl-4'-methyl-2,2'-bipyridyl)ruthenium(II) System", J. Am. Chem. Soc., vol. 104, 2641-2642 (1982).

Brilmyer, et al., "Electrogenerated Chemiluminescence. XXXVI. The Production of Steady Direct Current ECL in Thin Layer and Flow Cells", J. Electrochem. Soc., vol. 127, No. 1, pp. 104-110 (1980).

Lee, et al., "Electrogenerated Chemiluminescence. Part 51. The Tris(2,2'-Bipyrazine)Osmium(II) System", J. Electroanal. Chem., vol. 244, pp. 319-324 (1988).

Ouyang, et al., "Electrogenerated Chemiluminescence, 50. Electrochemistry and Electrogenerated Chemiluminescence of Micelle Solubilized $OS(bpy)_3^{2+}$", Bull. Chem. Soc. Jpn., vol. 61, No. 1, pp. 17-24 (1988).

Ege, et al., "Electrogenerated Chemiluminescent Determination of $Ru(bpy)_3^{2+}$ at Low Levels", Analytical Chemistry, vol. 56, No. 13, pp. 2413-2417 (1984).

Rubinstein, et al., "Electrogenerated Chemiluminescent Determination of Oxalate", Analytical Chemistry, vol. 55, No. 9, pp. 1580-1582 (1983).

DEVICES AND METHODS FOR GENERATING ELECTROGENERATED CHEMILUMINESCENCE

This is a continuation of co-pending application Ser. No. 07/416,241, filed on Oct. 2, 1989, now abandoned.

BACKGROUND OF THE INVENTION

1. Field of the Invention

This invention relates to electrogenerated chemiluminescence. More particularly, it relates to devices and methods for generating electrogenerated chemiluminescence.

2. Description of Related Art

Electrogenerated chemiluminescence, alternatively referred to as electrochemiluminescence and abbreviated hereinafter as "ECL," is an electrochemical means for converting electrical energy into radiative energy, i.e., light at low voltages. ECL systems and devices which use solutions of luminescent molecules (i.e. molecules which upon electrical excitation are capable of emitting ECL) have been widely studied, and are used for such purposes as display devices and instruments for chemical analysis.

In conventional ECL devices, luminescent molecules are homogeneously distributed in solutions. These types of systems may possess inherent disadvantages in that a relatively large amount of ECL luminescor is typically contained in the solution and must be continuously supplied to the electrode surface to maintain emission. The intensity of emission of these devices may be limited by the rate of diffusion of the luminescor in the solution to the electrode and may be sensitive to impurities in the solution.

It is an object of the invention to provide devices and methods for generating ECL which overcome or reduce at least some of the disadvantages of prior art systems.

SUMMARY OF THE INVENTION

One broad aspect of the present invention provides an ECL cell comprising at least two electrodes immersed in an electrolyte solution, and means for supplying an electrical potential between the electrodes. One of the electrodes is coated with an immobilized layer of a first compound capable of generating ECL. The electrolyte solution contains a second compound capable of reacting with the first compound to generate ECL.

Another broad aspect of the present invention provides a method for generating ECL. A first electrode is coated with an immobilized layer of a first compound capable of generating ECL. The first electrode and a second electrode are immersed in an electrolyte solution containing a second compound capable of reacting with the first compound to generate ECL. An electrical potential is supplied between the electrodes such that the first and second compounds react to generate ECL.

The term "coated" as used herein means both full coatings where the entire surface of the electrode is coated, and partial coatings where only a portion or portions of the electrode surface is coated.

In a preferred embodiment, the first compound comprises a surfactant. The term "surfactant" is used herein to mean a surface active agent or molecule with amphipathic structure. These molecules are composed of groups with opposing solubility tendencies, typically an oil-soluble (hydrophobic) hydrocarbon chain and a water-soluble (hydrophilic) group. These molecules tend to adsorb or concentrate, and frequently form oriented monolayers, at the interface between phases.

For example, when the electrolyte solution is aqueous, the surfactant may comprise a compound having a relatively strongly hydrophobic group, which will tend to be repelled by the aqueous electrolyte and thus hold the compound against the surface of the electrode.

In one embodiment, the immobilized layer on the first electrode comprises a monomolecular layer (i.e. layer having single molecule thickness) of the first compound. Alternatively or in addition, the immobilized layer may comprise an organized molecular layer of the first compound. The term "organized molecular layer" is used herein to mean a layer having molecules similarly aligned or oriented in relation to the surface of the electrode.

The first compound may comprise a metal complex, such as a derivative of tris-(2,2'-bipyridine) ruthenium, abbreviated hereinafter as $Ru(bpy)_3^{2+}$. A particularly preferred derivative of $Ru(bpy)_3^{2+}$ for use in this invention has the following formula:

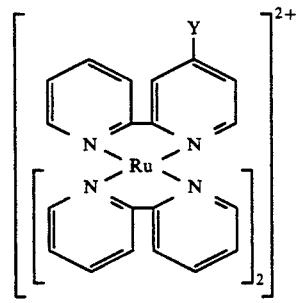

wherein Y comprises a hydrocarbon chain having a length of at least about 8 carbons.

The structure illustrated above is intended to include all $Ru(bpy)_3^{2+}$ derivatives having a hydrocarbon chain Y substituted at the $C_5$ position on one of the pyridine rings. (The conventional numbering system for bipyridine is used herein, $C_1$ being the bridged carbon in each ring, N being the number 2 position, and so on. For example, Y is shown at the $C_5$ position above). Thus, the Y-substituted ring may have additional substitutions at other positions; the pyridine ring which is bridged to the Y-substituted pyridine ring may have one or more substitutions; the other bipyridine units may have one or more substitutions; etc. All such embodiments are intended to be covered by the structure illustrated above.

Alternatively, the hydrocarbon chain substitution Y could be located at some other position (e.g. $C_3$ or $C_4$), but $C_5$ is preferred for stacking and organization of the molecular layer.

In a particularly preferred embodiment, the pyridine ring which is bridged with the Y-substituted pyridine ring shown above also has a hydrocarbon chain substituted at the $C_5'$ position. This embodiment may be preferable for ease of synthesis, and also may stack more efficiently on an electrode surface in accordance with this invention.

The term "hydrocarbon chain" as used herein includes pure and substituted hydrocarbon chains. Since the hydrocarbon chain can serve as a long hydrophobic tail, generally the longer the hydrocarbon chain, the better for use in this invention. However, chains which are excessively long may cause the compound to be essentially insoluble and therefore impractical for use in this invention, due to difficulties in depositing a layer onto an electrode surface. Preferably, the length of the hydrocarbon chain is from about 8 to 22 carbons, most preferably from about 12 to 22 carbons.

In one preferred embodiment, the hydrocarbon chain Y comprises a stearamidomethylene chain.

In another preferred embodiment, the hydrocarbon chain includes a thiol end group anchored to the first electrode. Since thiol groups have a particular affinity for certain metals such as gold, platinum, silver or mercury, the first electrode preferably comprises one of these metals.

In one preferred embodiment, the first electrode may comprise a semiconductive material, such as indium-doped tin oxide. (In-doped $SnO_2$ will be sometimes abbreviated herein as "ITO"). Semiconductor electrodes may provide advantages over metallic electrodes in some contexts in that a semiconductive material may have less tendency to quench luminescing molecules in the immobilized ECL layer.

In the practice of the invention, molecules capable of generating ECL are immobilized onto the surface of an electrode; thus, the electrolyte solution may be substantially free of such molecules.

In a preferred embodiment, the second compound (i.e., the ECL reactant in the electrolyte solution) comprises oxalate or tri-n-propylamine.

BRIEF DESCRIPTION OF THE DRAWINGS

FIG. 8: Pt/mica electrode. FIG. 9: Au foil electrode.

DETAILED DESCRIPTION OF PREFERRED EMBODIMENTS

Figure 1:
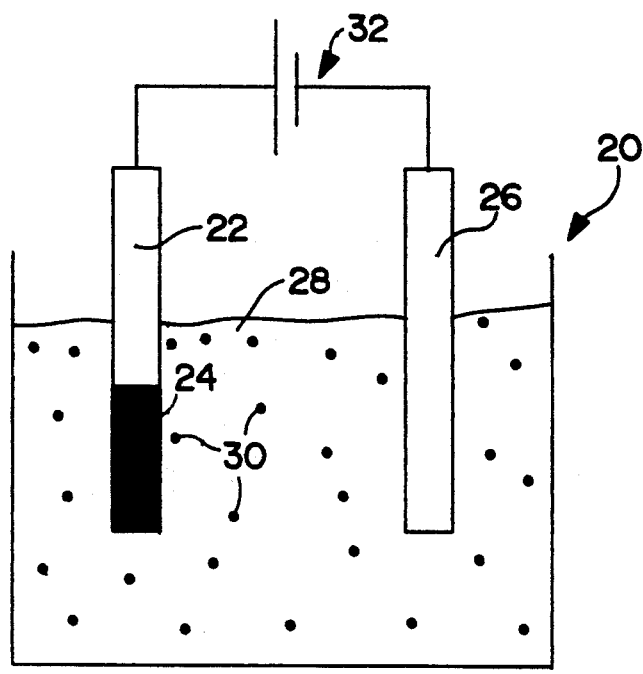
FIG. 1 is a schematic drawing of an ECL cell as provided by the present invention.

Referring to FIG. 1, an ECL cell 20 as provided by the present invention is schematically illustrated. The cell 20 includes a first electrode 22 which is coated with an immobilized layer 24 of a first compound capable of generating ECL, such as a complex of ruthenium or osmium. The first electrode 22 and a second electrode 26 are immersed into an electrolyte solution 28 which contains a second compound (represented as dots 30) which is capable of reacting with the first compound 24 to generate ECL. Means 32 are provided for supplying an electrical potential between the electrodes 22 and 26. In use of cell 20, an electrical potential is supplied by means 32 such that the electrode-bound compound 24 is electrolyzed to produce a species that reacts with dissolved compound 30 to generate ECL.

Figure 2:
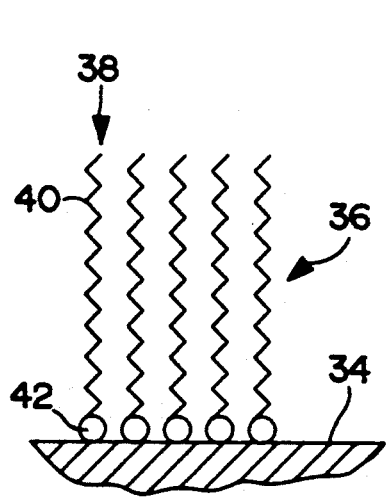
FIG. 2 is a schematic drawing of an electrode coated with an organized monomolecular layer.
Figure 3:
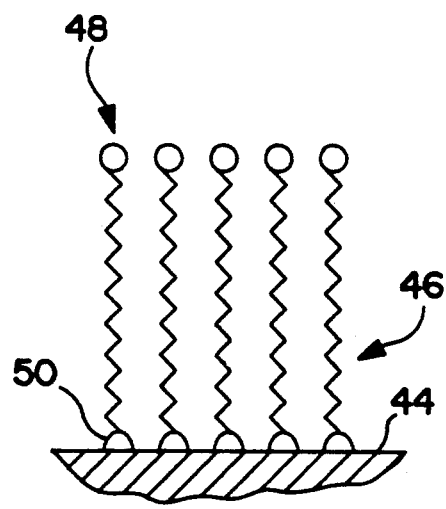
FIG. 3 is a schematic drawing of an electrode coated with an organized monolayer of anchored molecules.

FIGS. 2 and 3 present theorized views of organized monomolecular layers coated onto electrode surfaces. It should be appreciated that any theory presented herein is for illustrative purposes only, and the disclosure and claims should not be construed as being bound thereto.

FIG. 2 schematically illustrates a preferred coated electrode for use in this invention. As shown, the electrode 34 is coated with an organized monomolecular layer 36. That is, an organized (i.e. similarly aligned) assembly of molecules 38 are immobilized on the surface of the electrode surface 34. As can be seen, the layer 36 is a single molecule thick, i.e. a monomolecular layer.

In this embodiment, each molecule 38 includes a long hydrophobic tail 40 (e.g. a hydrocarbon chain of about 18 carbon chain-length), and a hydrophilic head group 42, such as a Ru(bpy)$_3^{2+}$ complex. The hydrophilic head groups 42 are attracted to the electrode surface 34 which is also preferably hydrophilic.

This type of electrode is particularly suited for use with an aqueous electrolyte, which will tend to repel the hydrophobic tail portion 40 of the molecules 38 towards the surface of the electrode 34. Having the molecules of the coated layer assemble in an organized fashion as shown allows dense packing of the ECL molecules onto the electrode surface, thereby providing the ability for intense ECL emission in use.

FIG. 3 schematically illustrates an alternative preferred coated electrode for use in this invention. In this embodiment, the electrode 44 is also coated with an organized monomolecular layer 46. However, in this embodiment, the ECL molecules 48 each include an anchoring end group 50, i.e. a group capable of chemically adsorbing or bonding to the electrode surface 44. For example, end group 50 could be a thiol group anchored to an appropriately selected metal 44, such as gold, platinum, mercury, or silver, or a group that could be covalently linked to an oxide surface through a silane linkage.

This embodiment may possess advantages in some application over that of FIG. 2, in that the layer may be more strongly affixed to the electrode, and thus might not be washed away in various types of electrolyte solutions, e.g. non-aqueous solutions.

It will be appreciated by those skilled in the art that various preferred embodiments of the present invention provide a class of ECL devices, having active constituents (i.e., the luminescent molecules) confined to surfaces of electrodes as immobilized layers, e.g. organized monolayers, submonolayers (i.e. monolayers covering less than all of the electrode surface) and multilayers. This should be contrasted to conventional ECL devices in which luminescors are homogeneously distributed in solutions or polymer films.

In the practice of certain preferred embodiments, monolayers of luminescors are excitable in an electrochemical cell containing a suitable solution by the application of an electrical potential to a monolayer-covered electrode. Despite the possible direct electron- and energy- transfer quenching of the excited states by electrodes, the ECL emission from the luminescor monolayers can be easily detectable and is very intense with some electrode materials, such as ITO. Compared to ECL systems that incorporate luminescor solutions, those incorporating luminescor monolayers in accordance with the present invention may be less sensitive to luminescent and redox impurities, and their emissions may not be limited by the diffusion of luminescors.

By providing an excitable monolayer assembly on conductive substrates, these ECL devices can be applied to studies of electron transfer and energy transfer processes at electrified interfaces, for example, the quenching of excited states with various electrode materials and under controlled potential. ECL has been used as a highly sensitive analytical method; the monolayer approach provided by various embodiments of this invention may provide even higher sensitivity, with a smaller amount of luminescors concentrated on an electrode surface.

The immobilized layer technique as described herein may also be useful in the fabrication of ECL detectors. For example a $Ru(bpy)_2(bpy-C_{19})^{2+}$ structure illustrated below in Example 1) monolayer on $SnO_2$ may be useful for detecting oxalate (from urine or blood samples), and tertiary amines, amino acids, etc., in solution.

Devices of this invention may also be useful in high sensitivity detection of labelled compounds. By deposition of the molecule labelled with the surface-active tag, the detection limits may be greatly reduced. For example, a monolayer of $Ru(bpy)_2(bpy-C_{19})^{2+}$ contains about $1.3 \times 10^{-10}$ mol$^2$/cm$^2$ ($7.7 \times 10^{13}$ molecules/cm$^2$). Detection of 1% of a monolayer on 1 cm$^2$ ITO is possible, so that emission from 1.3 pmoles ($7.7 \times 10^{11}$ molecules) could be observed. Lower detection limits may also be possible. The availability of a surface-active tag would also simplify the analysis allowing separation from reaction medium, washing, etc.

In one preferred embodiment, ECL cells are provided using certain derivatives of $Ru(bpy)_3^{2+}$ which are capable of self assembling via adsorption onto conducting substrates (e.g. ITO, gold films on glass and platinum foil). In self assembly the strong molecular interactions between molecules spontaneously leads to an organized assembly on a surface during adsorption or attachment of the molecules to the surface. The derivatization may also include alkyl side chains which are not readily susceptible to medium catalyzed side reactions. The derivatization may also include thiol anchoring groups which generally have an affinity for and thus can readily chemisorb on such metal electrodes as gold, platinum, silver, and mercury. Such modified electrodes may be compatible with both aqueous and nonaqueous electrolyte media.

EXAMPLES

The following examples are designed to illustrate certain aspects of the present invention. The examples are not intended to be comprehensive of all features and all embodiments of the present invention, and should not be construed as limiting the claims presented herein.

EXAMPLE 1

ECL from an organized monomolecular layer of a surfactant derivative of $Ru(bpy)_3^{2+}$ consisting of a single stearic methylene amide chain linked to one bipyridine unit at the 4-position [shown below and abbreviated herein as $Ru(bpy)_2(bpy-C_{19})^{2+}$], was generated at the surface of ITO, platinum and gold electrodes.

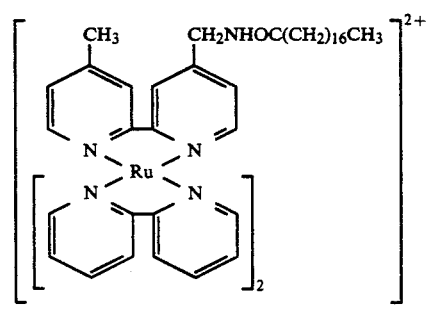

This emitter, was deposited on smooth metal and semiconductor electrodes as an organized assembly by the Langmuir-Blodgett method.

The observed luminescent emission was generated from the coated electrodes placed in aqueous oxalate solutions and biased to positive potentials. The ECL of the $Ru(bpy)_3^{2+}/C_2O_4^{2-}$ in aqueous media may arise from the oxidation of $Ru(bpy)_3^{2+}$ at an electrode in the presence of oxalate by the following proposed reaction sequence:

$$Ru(bpy)_3^{2+} \rightarrow Ru(bpy)_3^{3+} + e^- \quad (1)$$

$$Ru(bpy)_3^{3+} + C_2O_4^{2-} \rightarrow Ru(bpy)_3^{2+} + C_2O_4^- \quad (2)$$

$$C_2O_4^- \rightarrow CO_2 + CO_2^- \quad (3)$$

$$Ru(bpy)_3^{2+} + CO_2^- \rightarrow Ru(bpy)_3^+ + CO_2 \quad (4)$$

$$Ru(bpy)_3^{3+} + Ru(bpy)_3^+ \rightarrow Ru(bpy)_3^{2+*} + Ru(bpy)_3^{2+} \quad (5)$$

$$Ru(bpy)_3^{3+} + CO_2^- \rightarrow Ru(bpy)_3^{2+*} + CO_2 \quad (6)$$

This ECL system was found useful in the determinations of both $Ru(bpy)_3^{2+}$ and oxalate at low concentration levels.

Preparation and Purification of the Surfactant $Ru(bpy)_3^{2+}$. Ruthenium(II) bis(2,2'-bipyridine) (4-methyl-4'-aminomethyl-2,2'-bipyridine)perchlorate, 20 mg, and ca. 100 mg of stearoyl chloride (Nu-Check Prep) were dissolved in 10 mL of dichloromethane (Baker, spectrophotometric grade) and held at ca. 5° C. under an $N_2$ atmosphere. Pyridine (Mallinckrodt, spectrophotometric grade) was then added dropwise and the reaction was allowed to occur for several hours with magnetic stirring. The inorganic precipitate and the solvent were removed by filtration and distillation under reduced pressure, respectively. The desired product, $Ru(bpy)_2(bpy-C_{19})^{2+}$, left in the flask was identified by silica gel thin-layer chromatography from the fluorescence induced by UV irradiation. The purification of the product was carried out by open-column liquid chromatography with an activated silica particle column (20 cm×1 cm, 100 mesh) and $CH_2Cl_2$ and MeOH (Baker, spectrophotometric grade) eluants. $Ru(bpy)_2(bpy-C_{19})^{2+}$ was crystallized from the final MeOH solution in the refrigerator. The resulting solid was washed several times with Milli-Q water and dried in a vacuum desiccator. It was finally recrystallized twice from chloroform (Fisher, spectrophotometric grade) at $-20°$ C. The $Ru(bpy)_2(bpy-C_{19})^{2+}$, collected as the perchlorate salt, was a red solid and weighed ca. 10 mg. Its purity was assessed by high-resolution proton NMR in $CD_3Cl$. Its resistance against hydrolysis in neutral aqueous medium was also checked by NMR after extracting the solution with $D_2O$.

Preparation of Electrodes

ITO on glass and platinum on glass and mica, as well as Pt and Au foils, were used as substrates for coating with monolayers of $Ru(bpy)_2(bpy-C_{19})^{2+}$. Pt/mica and Pt/glass electrodes were prepared by sputtering Pt (ca. 200 nm thick) on freshly peeled mica sheets and clean glass slides in an Ar plasma with a MRC (Material Research Co., Orangeburg, N.Y.) Model 8620 sputtering system. All substrates were cleaned prior to use. The $SnO_2$/glass slides were cleaned by soaking in a KOH/EtOH bath, sonicating in PrOH, and rinsing with water. The metal electrodes were cleaned by sonicating in acetone followed by rinsing with $0.5M$ $H_2SO_4$ and water. A monolayer of $Ru(bpy)_2(bpy-C_{19})^{2+}$ was deposited on the substrate by the Langmuir-Blodgett method with a Lauda film balance (Brinkmann, Westbury, N.Y.). Thirty microliters of a 2.00 mM chloroform solution of $Ru(bpy)_2(bpy-C_{19})^{2+}$ equiv $3.6 \times 10^{16}$ molecules) was spread on the surface of a subphase solution, 1.0 mM $NaClO_4$ (Fisher) in water. The subphase solution was cleaned by filtration through a Nylon-66 filter, pore size 0.2 micron (Rainin, Woburn, Mass.) and adjusted to pH 7. The transfer of the monolayer film to the electrode substrates was done at a lifting rate of 0.5 cm/min and a controlled constant surface pressure of 30 dyn/cm. The surface pressure-area isotherms were recorded with the film balance apparatus.

Electrochemical and ECL Measurements

The electrochemical measurements were made with a PAR (Princeton Applied Research, Princeton, N.J.) Model 175 potential programmer and a PAR Model 173 potentiostat. The ECL experiments were performed in a Pyrex cell containing an aq. $0.4M$ $Na_2SO_4$ (MCB) and $0.02M$ $Na_2C_2O_4$ (MCB) solution, with the substrate electrode modified by a monolayer of $Ru(bpy)_2(bpy-C_{19})^{2+}$ as the working electrode, and Pt gauze counter electrode and a saturated calomel reference electrode (SCE). The ECL emission was detected with a Hamamatsu (Middlesex, N.J.) Model R928 photomultiplier tube (PMT) and a Model C1230 photon counter. The PMT was sealed in a cooling chamber at ca. $-25°$ C. The ECL emission spectra were taken with an Oriel (Stamford, Conn.) Model 77250 monochromator that was placed between the optical cell and the PMT and driven by an electric motor at a speed of ca. 1.2 nm/s. All experiments were carried out at room temperature ($22°\pm1°$ C.).

Monolayer Deposition

Figure 4:
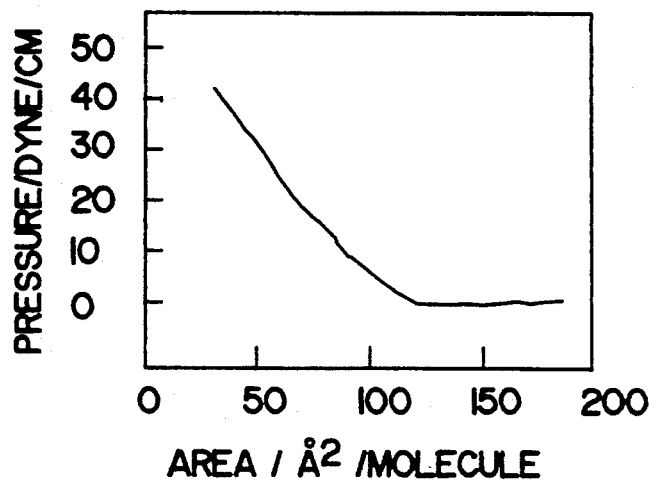
FIG. 4 is a plot of the surface pressure-area isotherm of Ru(bpy)$_2$(bpy-C$_{19}$)$^{2+}$ at 22°±1° C. (Example 1). Subphase: 1.0 mM NaClO$_4$ aqueous solution (pH 6.7).

A monolayer of $Ru(bpy)_2(bpy-C_{19})^{2+}$ formed by spreading a small quantity of the surfactant dissolved in chloroform on the surface of a neutral 1.0 mM $NaClO_4$ aqueous solution, showed the surface pressure-area isotherm given in FIG. 4. The pressure started to rise at ca. 125 Å/molecule and then increased almost linearly with a decrease in area until ca. 42 dyn/cm, when the monolayer film broke. This monolayer film of $Ru(bpy)_2(bpy-C_{19})^{2+}$ with a single hydrocarbon chain was more compressible than most of the other surfactant derivatives of $Ru(bpy)_3^{2+}$ with two attached hydrocarbon chains. The pressure-area isotherm was reproducible in both the compression and expansion modes over time periods of several minutes (typical of cyclic voltammetric and ECL measurements), indicating that hydrolysis was negligible in neutral aqueous solution. The composition of the subphase solution can affect the pressure-area isotherms of the surfactant derivatives of $Ru(bpy)_3^{2+}$ and the molecular packing structures in organized monolayers. In the preparations, a dilute solution of $NaClO_4$ was used as the subphase, because perchlorate ion was the counter ion in $Ru(bpy)_2(bpy-C_{19})^{2+}$. The same subphase was used with all electrode substrates. Since all of the electrode substrates had hydrophilic surfaces, the transfer of the monolayer to the electrodes was made by lifting the electrodes out of the subphase solution. The surfactant monolayer was thus believed to be coated on the electrodes with the hydrophilic site, the $Ru(bpy)_3^{2+}$ head group, against the electrode surface, and the hydrophobic hydrocarbon chain sticking out toward the solution. The coated electrode was then transferred in air to a deaerated solution in the electrochemical cell.

Cyclic Voltammetry

Figure 5:
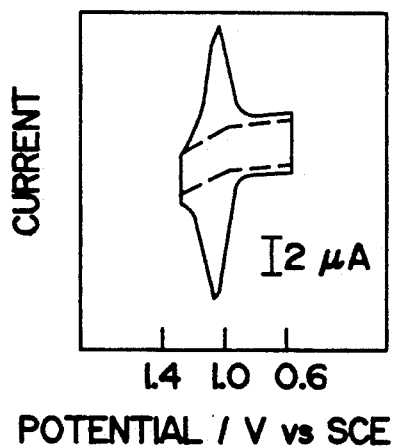
FIG. 5 is a plot of the cyclic voltammogram of monolayer of Ru(bpy)$_2$(bpy-C$_{19}$)$^{2+}$ coated on an ITO electrode (ca. 0.8 cm$^2$) obtained in 0.5M Na$_2$SO$_4$ aqueous solution (pH 5) at a scan rate of 200 mV/s (Example 1). Dotted line indicates background current.

The cyclic voltammogram (CV) for a monolayer of $Ru(bpy)_2(bpy-C_{19})^{2+}$ coated on $SnO_2$ electrode at a scan rate, v, of 200 mV/s in 0.5M $Na_2SO_4$ solution (pH 5) is shown in FIG. 5. The background current at a clean $SnO_2$ electrode in supporting electrolyte is shown as the dotted line in FIG. 5. The CV showed an anodic peak at $+1.06$ V vs SCE and had the characteristics of a redox system confined to an electrode surface. The oxidation and reduction peaks were almost symmetrical and showed no diffusional tails. The peak current, $i_p$, was proportional to v, from 50 to 500 mV/s. The difference between the anodic and cathodic peak potentials was ca. 30 mV and the potential width at the half-height of the peaks was slightly greater than the ideal value of 91 mV. The CV response remained essentially the same for the scans at 200 mV/s over a period of at least 5 min. The integrated CV response was equivalent to coverage of about 130 $Å^2$/molecule.

Figure 6:
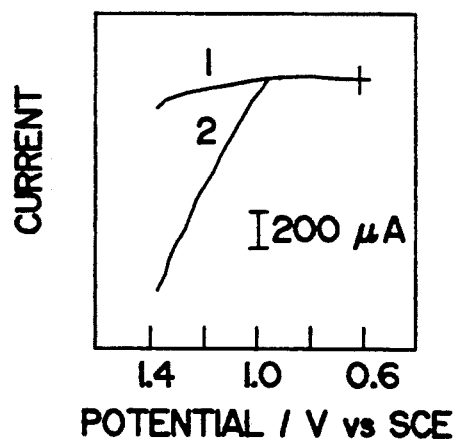
FIG. 6 is a plot of the current-potential curves for the oxidation of oxalate at a bare ITO electrode (1) and at the same ITO electrode coated with a monolayer of Ru(bpy)$_2$(bpy-C$_{19}$)$^{2+}$ (2), obtained in 0.02M Na$_2$C$_2$O$_4$, 0.4M Na$_2$SO$_4$ aqueous solution (pH 5.5) at 200 mV/s (Example 1). Electrode area: ca. 0.35 cm$^2$.

FIG. 6 shows a CV for the oxidation of oxalate at a bare $SnO_2$ electrode (curve 1) and the $SnO_2$ electrode coated with a monolayer of $Ru(bpy)_2(bpy-C_{19})^{2+}$ (curve 2), in 0.02M $Na_2C_2O_4$ and 0.4M $Na_2SO_4$ (pH 5.5), at v=200 mV/s. At a bare $SnO_2$ electrode the oxidation of oxalate was quite sluggish. The oxidation of oxalate at the $SnO_2$ electrode modified by a monolayer of $Ru(bpy)_2(bpy-C_{19})^{2+}$ was fast. The observed increase in anodic current was more pronounced here than in the previous cases involving dissolved $Ru(bpy)_3^{2+}$, indicating the monolayer system was a better catalyst for the oxidation of oxalate. At the $Ru(bpy)_2(bpy-C_{19})^{2+}$-monolayer-covered electrode surface, the oxidation of the most of the oxalate ions probably proceeded through the mediation of the oxidized surfactant, $Ru(bpy)_2(bpy-C_{19})^{3+}$, which would be regenerated very rapidly at the electrode at the applied potential.

Electrogenerated Chemiluminescence

Figure 7:
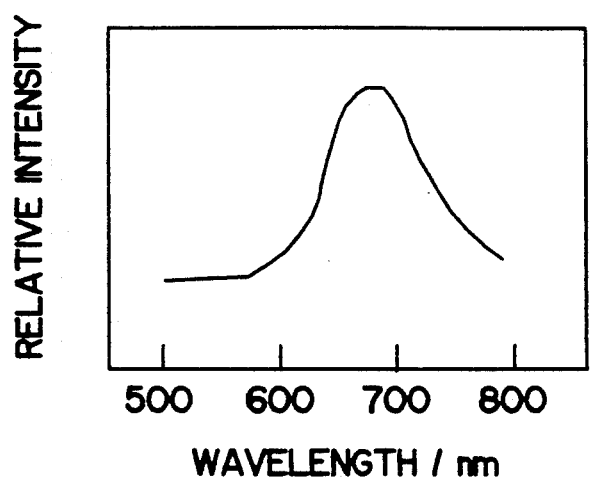
FIG. 7 is a plot of the ECL emission spectrum of monolayer of Ru(bpy)$_2$(bpy-C$_{19}$)$^{2+}$ coated on an ITO electrode, in 0.02M Na$_2$C$_2$O$_4$, 0.4M Na$_2$SO$_4$ aqueous solution (pH 5.5) with the electrode at +1.25 V vs SCE (Example 1).

ECL from a monolayer of Ru(bpy)$_2$(bpy-C$_{19}$)$^{2+}$ was observed with both SnO$_2$ and metal electrodes. When the potential of the working electrode with a monolayer of Ru(bpy)$_2$(bpy-C$_{19}$)$^{2+}$ was stepped to +1.25 V vs SCE to oxidize Ru(bpy)$_2$(bpy-C$_{19}$)$^{2+}$ to the +3 form, emission was observed. The rather intense ECL emission found with a SnO$_2$ electrode produced the spectrum shown in FIG. 7, generally characteristic of the luminescent emission of the Ru(bpy)$_3$$^{2+}$ species. The emission peak at 680 nm is at a longer wavelength than that found for solution phase Ru(bpy)$_3$$^{2+}$ (ca. 610 nm). The shift was believed to be caused by interactions among the surfactant molecules and between the surfactants and solid electrode surface. The emission maximum following photoexcitation of Ru(bpy)$_2$—(bpy-C$_{19}$)$^{2+}$ dissolved in MeCN was at about 600 nm.

Figure 8:
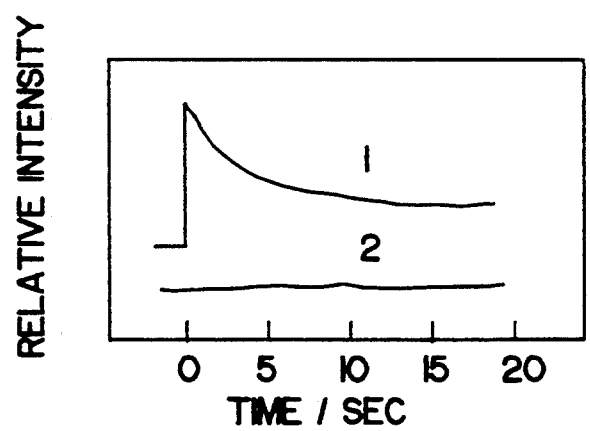
FIGS. 8 and 9 are plots of the ECL emission from monolayer of Ru(bpy)$_2$(bpy-C$_{19}$)$^{2+}$ coated on metal electrodes (1) and background emissions of the same electrodes after washing off the monolayer with chloroform (2), in 0.02M Na$_2$C$_2$O$_4$, 0.4M Na$_2$SO$_4$ aqueous solution (pH 5.5) with a potential step of +1.25 V vs SCE applied to the electrode at time 0 (Example 1).
Figure 9:
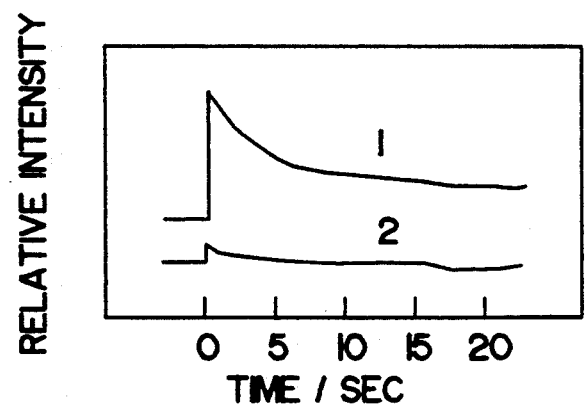

ECL of the monolayer Ru(bpy)$_2$(bpy-C$_{19}$)$^{2+}$ deposited on metal electrodes (i.e., Pt/mica, Pt/glass, Pt and Au foils) was also detected, although these emission intensities were generally 100-1000 times lower than those on a SnO$_2$ electrode of similar area. Pt sputtered on mica was shown by scanning tunneling microscopy (STM) to be atomically smooth. The ECL emission from a monolayer of Ru(bpy)$_2$(bpy-C$_{19}$)$^{2+}$ coated on such a Pt/mica electrode has been recorded and is shown in FIG. 8 (curve 1). The emission was greatest immediately after the potential step and then decayed with the square root of time during the initial several seconds, suggesting that the intensity was limited by the rate of diffusion of oxalate ions from solution bulk to the electrode surface. To assure that the observed emission was not from impurities or a hydrolysis product of Ru(bpy)$_2$(bpy-C$_{19}$)$^{2+}$ in solution, the experiment was repeated with the same electrode and solution after wiping off the surfactant monolayer from the Pt/mica surface with chloroform. The result is shown in FIG. 8 (curve 2); essentially no emission was detected following the potential step at the same sensitivity setting of the photon counter. In FIG. 9 ECL emission from an Au foil electrode coated with a monolayer of Ru(bpy)$_2$(bpy-C$_{19}$)$^{2+}$ (curve 1) is compared to that from the same electrode after rinsing in chloroform (curve 2). The results for other electrodes (Pt/glass and Pt foil) were essentially identical with the ones presented in FIGS. 8 and 9.

ECL of the Ru(bpy)$_3$$^{2+}$-based system in a monolayer differs in several ways from that of similar system in solution. One might expect the excited-state Ru(bpy)$_3$$^{2+}$ centers (R*) in the monolayer to be quenched much more effectively by the conductive substrate by both energy- and electron- transfer routes. The fact that the intensity of emission is much greater at SnO$_2$ than the metal films suggests that this type of quenching occurs. Nevertheless, emission is seen from R* that is very near (several angstroms) the metal surface, showing that emission from the relatively long-lived emitter (radiative lifetime ca. 1 microsecond) can compete with the quenching process. One might also expect second-order quenching processes among Ru(bpy)$_3$$^{2+}$ centers, e.g.,

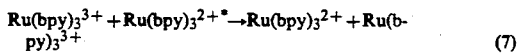

$$\text{Ru(bpy)}_3{}^{3+} + \text{Ru(bpy)}_3{}^{2+*} \rightarrow \text{Ru(bpy)}_3{}^{2+} + \text{Ru(bpy)}_3{}^{3+} \qquad (7)$$

to be important in the monolayer because the species are held in close proximity (ca. 13 Å from center to center according to the CV molecular area estimation) (i.e., the effective concentrations are high). On the other hand, the monolayer species are less mobile on the electrode surface and perhaps cannot orient for most effective electron and energy transfer between the species.

The rates of the reactions leading to R*, equations 1-6 above, may also differ in the monolayer. For example, production of the intermediate, CO$_2$$^-$, may be more effective in the monolayer, if the direct oxidation at the electrode surface of it and C$_2$O$_4$$^{2-}$ are effectively blocked by the monolayer. In this case any CO$_2$$^-$ at the monolayer will produce either R* directly via eq 6, or indirectly via (4) and (5); other processes leading to loss of this very reducing species, e.g., reduction of protons or dimerization, appear to also occur in both monolayer and solution reactions.

EXAMPLE 2

All solvents in this example were obtained from J. T. Baker (Philipsberg, N.J.) or Fisher Scientific and were of the highest quality available. Solvents, except where described, were used without further purification.

In this example, reference will be made to the following derivatives of Ru(bpy)$_3$$^{2+}$:

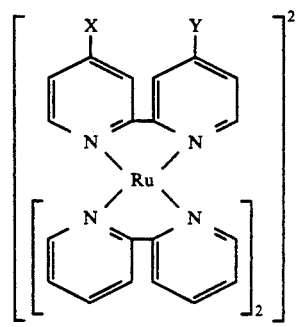

| Complex | X | Y |
|---|---|---|
| (I) | —CH$_3$ | —(CH$_2$)$_4$SH |
| (II) | —(CH$_2$)$_4$SH | —(CH$_2$)$_4$SH |
| (III) | —CH$_3$ | —(CH$_2$)$_{12}$SH |
| (IV) | —CH$_3$ | —CH$_3$ |

Preparation of 2,2'-Bipyridine Derivatives 4,4'-dimethyl-2,2'-bipyridine (Aldrich Chemicals) was recrystallized from ethyl acetate. The crystals were then vacuum dried at 25° C. overnight. Bromide precursors to the thiol derivatives were prepared by following the literature method of Ellinson and Twamoto, Tetrahedron Lett., 24(1), 31 (1983). The thiols were obtained by reacting the bromides with sodium hydrosulfide (NaSH, Aldrich Chemicals) in aqueous DMSO overnight and were purified by vacuum distillation on a Kugelrohr system (Aldrich Chemicals). Products were identified with either 360 or 300 MHz (General Electric) $^1$H NMR.

Preparation of (bpy)$_2$Ru(bpy') Complexes

Complexes (I) through (III) where bpy' is a derivatized 4,4'-dimethyl-2,2'-bipyridine, and (IV) where bpy' is underivatized 4,4-dimethyl-2,2'-bipyridine, were prepared by adapting published procedures. See B. Sullivan, et al., J. Inorg. Chem., 17, 1334 (1978). Products were purified by column chromatography on neutral alumina and were identified by $^1$H NMR and partial elemental analyses.

Preparation of Solid Substrates

ITO on glass (Delta Technologies Ltd., White Bear Lake, Minn.) were cut into ⅜" by 1½" pieces and sonicated in 10% detergent (Alconox) solution for 10 minutes after an overnight soak in 10% KOH in ethanol. The pieces were sonicated sequentially for some 10 minutes each in deionized distilled water (Milli-Q reagent water system, Millipore), absolute ethanol and propanol. The cleaned pieces were kept under absolute methanol in plastic containers.

99.99% gold was either sputtered (MRC Model 8620) or vapor deposited with the substrate at ambient temperature (Vacuum Engineering Co., North Billerica, Mass.), onto pretreated glass (vide infra). Inspection by scanning tunneling microscopy (STM) (Nanoscope II, Digital Instruments, Santa Barbara, Calif.) of the gold films showed the sputtered samples to be much smoother than the vapor deposited samples. However, the degree of roughness did not seem to affect the experimental results, hence the different samples were used interchangeably.

Platinum was used in the form of a foil flag; and was cleaned by sonicating in 5M sulfuric acid, followed by deionized distilled water, absolute ethanol and finally heated in an oxygen rich flame.

The ruthenium complexes were self assembled onto the solid supports by soaking the latter in millimolar chloroform solutions of the former for at least two hours. Inspection of the ECL emitted (with CCD series 200 camera cooled to $-110°$ C.), when the electrodes were biased to 1.25 V/SCE, showed the electrodes soaked for short times formed "islands" or "patches". Hence, overnight soaks were employed to obtain uniform coating. Long soaks, however, usually left substrates with yellow coloration, indicating the formation of multilayers. For use in ECL or electrochemical experiments substrates were first allowed to dry in air, then washed copiously with ionized distilled water, until washings were colorless to the eye. For chemisorption tests, substrates were treated as described then further washed sequentially with three cycles of absolute ethanol, chloroform, ethanol and water. To confirm that material was chemisorbed on the substrates, they were sonciated for about a minute in 1:1 ethanol-chloroform mixture, then rewashed with ethanol and water. This treatment was rather drastic and resulted in injuries to some gold on glass substrates.

Pretreatment of Glass for Gold Coating

As described in literature, the ECL of the Ru(bpy)$_3^{2+}$-oxalate system is activated by biasing the working electrode to about 1.25 V/SCE. At these potentials gold on untreated glass tends to peel off the support. In an attempt to circumvent this problem, a technique of "gluing" the gold layer onto the glass support was used. Microscope slides were cut into ⅜"×1½" pieces. The pieces were cleaned by sonicating in detergent solution for 30 minutes, rinsing with water, resonicating for 10 minutes in absolute ethanol, 3 hours of sonication in hexane, and then boiling for 3 more hours in aqua regia (1:1 HNO$_3$-HCl). After the boiling, the glass was rinsed copiously with water and stored under absolute methanol overnight. The silination of the glass was conducted in rigorously anhydrous environment in dry benzene with 3-mercaptotrimethoxysilane (Petrarch Systems, Bristol, Pa.) for 24 hours, by following published procedures. See I. Haller, *J. Am. Chem. Soc.*, 100, 8050 (1978) and P. Moses, et al., *Anal. Chem.*, 47, 1882 (1975).

ECL and Electrochemical Measurements

Electrochemical measurements were conducted in N$_2$ degassed aqueous solution of 0.2M Na$_2$SO$_4$, the pH of which had been adjusted to 4.5 with dilute sulfuric acid. ECL experiments were conducted in a similar solution containing 0.1M Na$_2$C$_2$O$_4$ and 0.4M Na$_2$SO$_4$ of pH 5. Although, the solutions used for all experiments were predegassed, replicate measurements with undegassed solutions afforded identical results. ECL emissions were monitored at room temperature with Hamamatsu (Hamamatsu Photonics, Hamamatsu City, Japan) PMT model R958 connected to PM Photometer (American Instrument Co., Silver Springs, Mass.). Meter output was fed into the Y-axis of a Houston Instrument model 2000 X-Y recorder while the signal from a PAR potentiostat model 173 was fed into the X-axis to afford ECL intensity versus bias potential displays. Low level ECL and spectra were imaged with CCD series 200 camera (Photometrics Ltd., Tucson, Ariz.) interfaced to a Dell system 200 personal computer.

Characterization of the Ruthenium Complexes

The complexes (I) through (IV) were characterized by UV-Visible, $^1$H NMR and partial elemental analyses. The electronic spectra and microanalytical results are summarized in Tables 1 and 2 respectively.

TABLE 1

| COMPLEX | ELECTRONIC SPECTRUM*<br>λ max/nm (ε*10$^{-4}$ Lmol-1cm-1) |
|---|---|
| (I) | 208(6.4), 257(3.8), 286(11.5), 452(0.56), |
| (II) | 209(6.1), 289(8.5), 400(0.37), 452(1.0), 486(0.24) |
| (III) | 244(2.8), 287(8.3), 400(0.64), 454(1.2), 656(0.0025) |
| (IV) | 285(14.3), 369(8.3), 400(1.4), 452(2.1), 486(1.1), 582(0.54) |

*Spectra were taken in acetonitrile.

TABLE 2

| COMPLEX | C$_{calc.}$ | (C$_{found}$) | H$_{calc.}$ | (H$_{found}$) | N$_{calc.}$ | (N$_{found}$) |
|---|---|---|---|---|---|---|
| (I) | 42.94 | (43.97) | 3.72 | (3.87) | 8.84 | (8.59) |
| (II) | 43.80 | (43.55) | 3.88 | (3.61) | 8.09 | (8.18) |
| (III)* | 47.50 | (47.71) | 5.02 | (5.50) | 7.73 | (9.43) |
| (IV) | 43.29 | (43.36) | 3.19 | (3.49) | 9.47 | (9.13) |

*Purity and structure confirmed by $^1$H NMR.

Self Assembling of Complexes onto Solid Substrates

Solid substrates such as ITO, gold on glass and platinum foils, when dropped into millimolar solutions of the ruthenium complexes described above in methylene chloride developed yellow coloration overnight. When these substrates were removed from the solution, allowed to dry, washed copiously with deionized distilled water and examined electrochemically in 0.2M Na$_2$SO$_4$, redox waves due to the adsorbed materials were observed.

Figure 10:
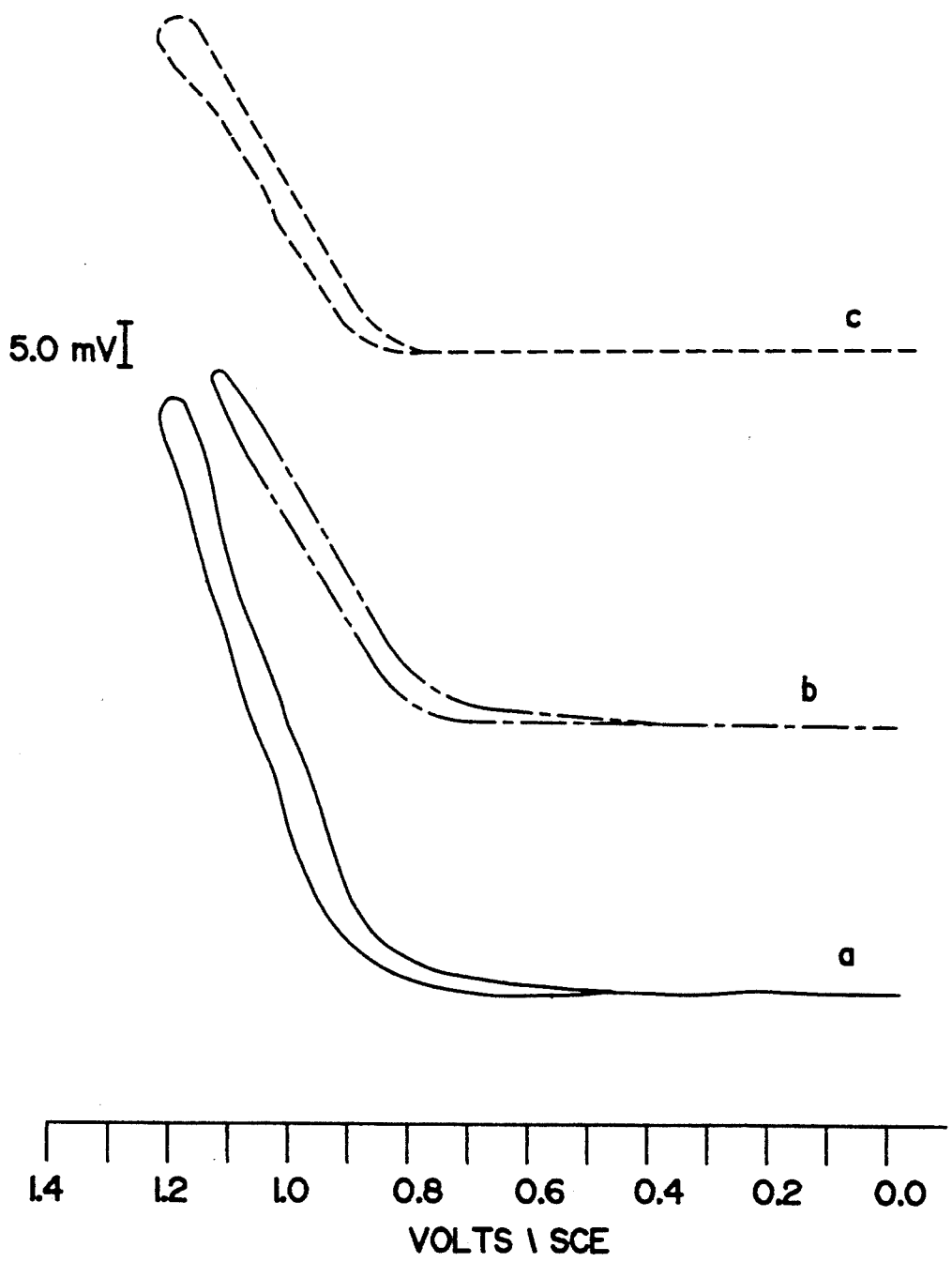
FIG. 10 is a plot of the PMT response as a function of bias potential of complex (III) on gold (Example 2):
(a) substrate washed with only water;
(b) same substrate as in (a) after organic solvents wash;
(c) substrate in (b) after sonication and rewash.

FIG. 10 shows the PMT response as a function of potential applied to a gold electrode treated with (III) after (a) copious water wash, (b) three cycles of CH$_3$Cl/C$_2$H$_5$OH/H$_2$O washes and (c) sonication in 1:1 CH$_2$Cl$_2$—C$_2$H$_5$OH for 5 minutes followed by three ethanol—water wash cycles. Although the latter treatment resulted in some injuries to the gold film, it appeared from the relative intensities of the PMT responses that treatment (b) removed most of the physically adsorbed materials.

Of the complexes studied, (I) and (III) chemisorbed on gold. The emission from (III) was found to be more intense than (I). The intensity may not have been due to the intrinsic ability of (III) to emit, but rather to the amount of material that got onto the substrate. Low temperature imaging of the ECL with the CCD camera showed patches on surfaces treated with either complex.

Compound (II) was not found to adsorb on any of the substrates. This may be due to steric interference and/or the unfavorable thermodynamics of anchoring two sites of a molecule to a substrate. Alternatively, it could be that one end anchored to the surface but, given the affinity of thiols for water, the material was washed off during the preparation of the electrode.

Figure 11:
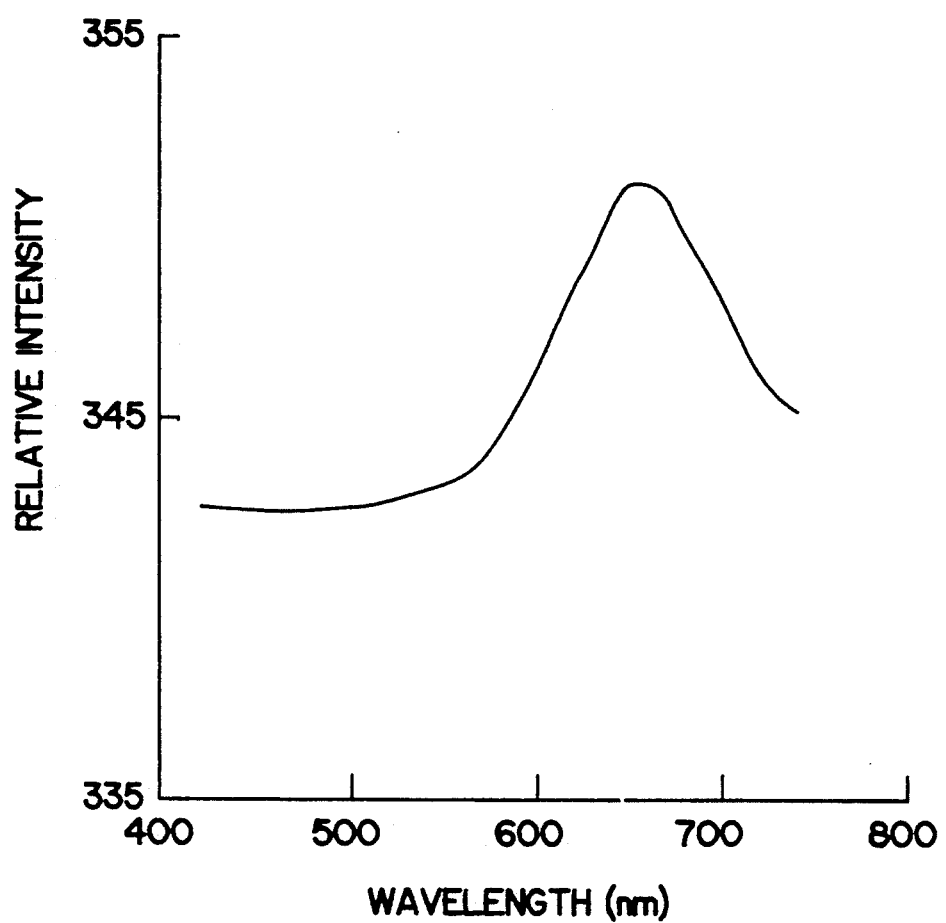
FIG. 11 is a plot of the ECL spectrum of complex (III) chemisorbed on gold (Example 2).

The emission from (III) on gold was intense enough to be dispersed into a spectrum as shown in FIG. 11. the emission peak of 650 nm as compared to 680 nm in Example 1 seems to suggest that the interaction between the chemisorbed species may not have been as ardent as in the mechanically assembled monolayers.

This invention has been disclosed in connection with specific embodiments. However, it will be apparent to those skilled in the art that variations from the illustrated embodiments may be undertaken without departing the spirit and scope of the invention.

What is claimed is:

1. An ECL cell, comprising:
   a first electrode;
   a nonpolymeric layer of a first metal complex compound with an emissive excited state in the visible or near-visible region that can be oxidized or reduced, and which is capable of generating ECL during use, wherein the first metal complex compound is immobilized on at least one surface of the first electrode during use;
   a second electrode;
   an electrolyte solution containing a second compound capable of generating a reductant upon oxidation or an oxidant upon reduction, and capable of reacting with the first metal complex compound to produce the excited state of the first metal complex compound during use, the electrodes being immersed in the electrolyte solution; and
   an electrical potential supply for supplying an electrical potential between the electrodes.

2. An ECL cell, comprising:
   a first electrode;
   a layer of a first metal complex compound with an emissive excited state in the visible or near-visible region that can be oxidized or reduced, and which is capable of generating ECL during use, wherein the first metal complex compound comprises a surfactant and is immobilized on at least one surface of the first electrode;
   a second electrode;
   an electrolyte solution containing a second compound capable of generating a reductant upon oxidation or an oxidant upon reduction, and capable of reacting with the first metal complex compound to produce the excited state of the first metal complex compound during use, the electrodes being immersed in the electrolyte solution; and
   an electrical potential supply for supplying an electrical potential between the electrodes.

3. An ECL cell, comprising:
   a first electrode;
   a monomolecular layer of a first metal complex compound with an emissive excited state in the visible or near-visible region that can be oxidized or reduced, and which is capable of generating ECL during use, wherein the first metal complex compound is immobilized on at least one surface of the first electrode;
   a second electrode;
   an electrolyte solution containing a second compound capable of generating a reductant upon oxidation or an oxidant upon reduction, and capable of reacting with the first metal complex compound to produce the excited state of the first metal complex compound during use, the electrodes being immersed in the electrolyte solution; and
   an electrical potential supply for supplying an electrical potential between the electrodes.

4. The cell of claim 1, wherein the immobilized layer comprises a molecular layer of the first metal complex compound having molecules aligned or oriented in a similar direction.

5. The cell of claim 1, wherein the second compound comprises oxalate or tri-n-propylamine.

6. The cell of claim 1, wherein the first metal complex compound comprises a derivative of $Ru(bpy)_3^{2+}$.

7. The cell of claim 6, wherein the derivative of $Ru(bpy)_3^{2+}$ comprises a compound having the formula:

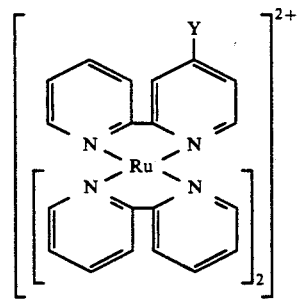

wherein Y comprises a hydrocarbon chain having a length of at least about 8 carbons.

8. The cell of claim 7, wherein the length of the hydrocarbon chain is from about 8 to 22 carbons.

9. The cell of claim 7, wherein the length of the hydrocarbon chain is from about 12 to 22 carbons.

10. The cell of claim 7, wherein the hydrocarbon chain comprises a stearamidomethylene chain.

11. The cell of claim 7, wherein the hydrocarbon chain includes a thiol group anchored to the first electrode.

12. The cell of claim 1, wherein the first electrode comprises a semiconductive material.

13. The cell of claim 1 or 11, wherein the first electrode comprises gold, platinum, silver, or mercury.

14. The cell of claim 1, wherein the electrolyte solution is substantially free of molecules capable of generating ECL.

15. The cell of claim 5, wherein the first metal complex compound comprises a derivative of $Ru(bpy)_3^{2+}$.

16. A method for generating ECL, comprising the steps of:
   immobilizing a nonpolymeric layer of a first metal complex compound with an emissive excited state in the visible or near-visible region that can be oxidized or reduced, and which is capable of generating ECL during use, on at least one surface of a first electrode;
   immersing the first electrode and a second electrode in an electrolyte solution containing a second compound capable of generating a reductant upon oxidation or an oxidant upon reduction, and capable of reacting with the first metal complex compound to produce the excited state of the first metal complex compound; and supplying an electrical potential between the electrodes such that the first and second compounds react to generate ECL.

17. A method for generating ECL, comprising the steps of:

immobilizing a layer of a first metal complex compound with an emissive excited state in the visible or near-visible region that can be oxidized or reduced, and which is capable of generating ECL during use, and which comprises a surfactant, on at least one surface of a first electrode;

immersing the first electrode and a second electrode in an electrolyte solution containing a second compound capable of generating a reductant upon oxidation or an oxidant upon reduction, and capable of reacting with the first metal complex compound to produce the excited state of the first metal complex compound; and supplying an electrical potential between the electrodes such that the first and second compounds react to generate ECL.

18. A method for generating ECL, comprising the steps of:

immobilizing a monomolecular layer of a first metal complex compound with an emissive excited state in the visible or near-visible region that can be oxidized or reduced, and which is capable of generating ECL during use, on at least one surface of a first electrode;

immersing the first electrode and a second electrode in an electrolyte solution containing a second compound capable of generating a reductant upon oxidation or an oxidant upon reduction, and capable of reacting with the first metal complex compound to produce the excited state of the first metal complex compound; and supplying an electrical potential between the electrodes such that the first and second compounds react to generate ECL.

19. The method of claim 16, wherein the immobilized layer comprises a molecular layer of the first metal complex compound having molecules aligned or oriented in a similar direction.

20. The method of claim 16, wherein the second compound comprises oxalate or tri-n-propylamine.

21. The method of claim 16, wherein the first metal complex compound comprises a derivative of $Ru(bpy)_3^{2+}$.

22. The method of claim 21, wherein the derivative of $Ru(bpy)_3^{2+}$ comprises a compound having the formula:

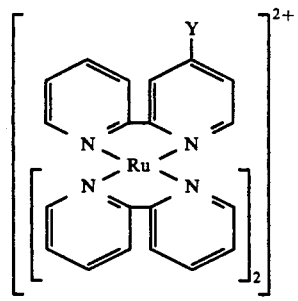

wherein Y comprises a hydrocarbon chain having a length of at least about 8 carbons.

23. The method of claim 22, wherein the hydrocarbon chain is from about 8 to 22 carbons.

24. The method of claim 22, wherein the length of the hydrocarbon chain is from about 12 to 22 carbons.

25. The method of claim 22, wherein the hydrocarbon chain comprises a stearamidomethylene chain.

26. The method of claim 22, wherein the hydrocarbon chain includes a thiol group anchored to the first electrode.

27. The method of claim 16 wherein the first electrode comprises a semiconductive material.

28. The method of claim 16 or 26, wherein the first electrode comprises gold, platinum, silver, or mercury.

29. The method of claim 16, wherein the electrolyte solution is substantially free of molecules capable of generating ECL.

30. The method of claim 20, wherein the first metal complex compound comprises a derivative of $Ru(bpy)_3^{2+}$.

31. The cell of claim 7, wherein the pyridine ring which is bridged with the Y-substituted pyridine ring is substituted at the $C_5'$ position with a second hydrocarbon chain having a length of at least about 8 carbons.

32. The method of claim 22, wherein the pyridine ring which is bridged with the Y-substituted pyridine ring is substituted at the $C_5'$ position with a second hydrocarbon chain having a length of at least about 8 carbons.

* * * * *